United States Patent

Saeki et al.

[11] Patent Number: 6,068,430
[45] Date of Patent: May 30, 2000

[54] MOUNTING MECHANISM FOR A PIN MIRROR CUTTER

[75] Inventors: Yukihiro Saeki; Syoji Takiguchi, both of Ohgaki; Nobukazu Horiike, Gifu-ken, all of Japan

[73] Assignee: Mitsubishi Materials Corporation, Tokyo, Japan

[21] Appl. No.: 09/235,312

[22] Filed: Jan. 22, 1999

[30] Foreign Application Priority Data

Jan. 22, 1998 [JP] Japan .................................. 10-010825

[51] Int. Cl.[7] ............................................ B23C 5/20
[52] U.S. Cl. ........................ 407/12; 407/35; 407/43; 407/58; 82/106; 82/107; 82/130
[58] Field of Search ....................... 407/12, 35, 40, 407/43, 47, 51, 53, 57, 58; 82/106, 107, 130

[56] References Cited

U.S. PATENT DOCUMENTS

| | | | |
|---|---|---|---|
| 4,964,762 | 10/1990 | Arai et al. | 407/47 X |
| 5,551,811 | 9/1996 | Satran et al. | 407/40 |
| 5,800,098 | 9/1998 | Satran et al. | 407/40 X |
| 5,919,008 | 7/1999 | Shimomura | 407/35 |

FOREIGN PATENT DOCUMENTS

| | | |
|---|---|---|
| 6-143018 | 5/1994 | Japan . |
| 6-206114 | 7/1994 | Japan . |
| 7-60529 | 3/1995 | Japan . |
| 8-257818 | 10/1996 | Japan . |
| 9-309019 | 12/1997 | Japan . |
| 10-180525 | 7/1998 | Japan . |
| 0722702 | 3/1980 | U.S.S.R. ................................ 407/43 |

*Primary Examiner*—Henry W. H. Tsai
*Attorney, Agent, or Firm*—Oblon, Spivak, McClelland, Maier & Neustadt, P.C.

[57] ABSTRACT

In a mounting mechanism for a pin mirror cutter 22, the cutter body 22 is mounted with its outer periphery inserted into the inner periphery of a cutter mounting portion. an inclined surface of a tapered portion 22 formed on the cutter body and an inclined surface of a tapered portion formed on the cutter mounting portion are in surface-contact with each other, and the diameters of the contact surfaces gradually decrease in the direction of insertion of the cutter body into the cutter mounting portion. Furthermore, these inclined surfaces and are formed by a plurality of flat surfaces so as to form regular octagonal pyramid surfaces.

14 Claims, 4 Drawing Sheets

MOUNTING MECHANISM FOR A PIN MIRROR CUTTER

BACKGROUND OF THE INVENTION

1. Field of the Invention

The present invention relates to a pin mirror cutter for machining or "working" a crankshaft of a reciprocating internal combustion engine, and more particularly, to a mounting mechanism for a pin mirror cutter for attaching and detaching a cutter body of the pin mirror cutter to and from a cutter mounting portion provided in a working machine.

2. Description of the Related Art

Pin mirror cutters, such as that shown in FIG. 3, have generally been known for use as a tool for working a crankshaft of a reciprocating internal combustion engine. As shown in the figure, pin mirror cutter 1 is detachably mounted onto the inner periphery of a ring-shaped cutter body 2 by means of bolts 5 with a plurality of chips 3 having cutting edges 4 projected from the inner peripheral surface of the cutter body 2.

The pin mirror cutter 1 is mounted to cutter mounting portion 7 provided in the working machine with its axis aligned so as to be substantially coincident with a shaft (not shown), as shown in FIG. 4. In addition, a crankshaft (not shown), which is to be machined, passes through an inner hollow section to be stretched between chucks 9 and 10 provided on the working machine 6.

In operation, the pin mirror cutter 1 is rotated about its axis in a fixed direction (in the direction of the arrow A of FIG. 3) by the shaft. In addition, while being rotated about its axis around the fixed crankshaft, the pin mirror cutter is moved in the axial direction, thereby working the crankshaft into a predetermined shape by the cutting edges 4 of the pin mirror cutter 1. In any method for working the crankshaft using such a pin mirror cutter 1, the alignment, or "coaxiality" between the axis of the pin mirror cutter 1 and a rotation axis of the shaft of the working machine 6 has a significant impact on the cutting or working accuracy.

For this reason, as shown in FIGS. 3 and 5, an annular step portion 11, coaxial with the shaft, is formed on the inner periphery of the cutter mounting portion 7, and an annular flange 12 is formed on the outer periphery of the cutter body 2 so as to be fitted with each other. Furthermore, concave fitting portions 13 are formed in a wall 11a facing the radial center of the step portion 11, and four key members 14 (one of them is omitted from FIG. 3) each projecting from the wall 11a, are fitted to the concave fitting portions 13. The key members 14 are typically formed in a rectangular parallelepiped and spaced at intervals of 90° around the inner periphery of the cutter mounting portion 7. Typically, the key members 14 are fitted to the respective concave fitting portions 13 which are precisely positioned so that center lines m in the width direction of the respective key members 14 intersect at a radial center P, and are fixed by bolts 15.

In addition, key grooves 17, each having the same width as the key members 14 and a rectangular cross section, are formed on the outer periphery of the cutter body 2 in an arrangement similar to that of the concave fitting portions 13. The key members 14 are fitted to the key grooves 17, so as to prevent radial movement and ensure coaxiality of the cutter body 2 with respect to the step portion 11 of the cutter mounting portion 7.

In mounting the cutter body 2 to the cutter mounting portion 7, the flange 12 of the cutter body 2 is fitted to the step portion 11 of the cutter mounting portion 7 and the key members 14 are fitted into the key grooves 17, whereby the cutter body 2 is mounted to the cutter mounting portion 7 in such a manner that the axis of the cutter body 2 coincides with the axis of the step portion 11. In addition, substantially semicircular recesses 18a and 18b constituting circular recesses 18 are formed in the flange 12 and the step portion 11, respectively, and clamps 19 having substantially semicircular shape are rotatably fitted to the circular recess 18. Once the clamps 19 are rotated in the recess 18a of the flange 12, whereby the cutter body 2 is firmly fixed to the cutter mounting portion 7, the mounting of the pin mirror cutter 1 to the working machine 6 is completed.

In a pin mirror cutter of this type, if the cutter body 2 is mounted to the cutter mounting portion 7 without precise alignment between the axis of the cutter body 2 with the axis of the cutter mounting portion 7, the workpiece cannot be worked into a truly round shape. Therefore, it is necessary to precisely center the cutter body 2 each time such is installed on the mounting portion 7.

Thus, according to the above mounting mechanism, the step portion 11 formed on the inner periphery of the cutter mounting portion 7 and the flange 12 formed on the outer periphery of the cutter body 2 are fitted to each other. Key members 14 are then fitted to the concave fitting portions 13 formed on the wall 11a of the step portion 11 and to the key grooves 17 formed in the flange 12 of the cutter body 2, thereby preventing radial movement and ensuring coaxiality of the cutter body 2 with respect to the step portion 11 of the cutter mounting portion 7.

Such a mounting mechanism, however, inherently suffers from reduced rigidity because the thicknesses of the step portion 11 and the flange 12 are about half the thickness of the cutter body 2. In addition, the depth of the circular recesses 18 further requires a reduction in the thickness of the flange 12, so that a sufficient thickness of the clamps 19 fitted to the circular recesses 18 cannot be provided, thereby compromising the rigidity of the clamps 19.

For the above reasons, it has been found that when the cutter body 2 having a lesser thickness is used in accordance with the size of the workpiece or when the cutting load increases, such as during high-speed and rapid-feed cutting, the cutter body 2 tends to chatter, thereby causing breakage of the chips 3 during cutting, and compromising working accuracy.

In particular, when the cutter body having a lesser thickness is used, the thickness of the key members 14 in contact with the grooves and fitting portions for transmitting a rotating torque of the cutter mounting portion 7 also decreases, so that the driving surfaces through which the torque is transmitted, i.e., contact areas among the key members 14, the concave fitting portions 13 and the key grooves 17, decrease and the torque is not efficiently transmitted from the cutter mounting portion 7 to the cutter body 2.

Furthermore, in the above mounting mechanism, a fixed clearance is provided between the flange 12 of the cutter body 2 and the step portion 11 of the cutter mounting portion 7, so as to allow easy mounting of the cutter body 2. However, such a clearance makes it more difficult to precisely mount the cutter body 2 to the cutter mounting portion 7 so that the axes thereof coincide with each other, and it has been found that the centering operation requires a great deal of labor.

SUMMARY OF THE INVENTION

The present invention is made in consideration of the foregoing circumstances, and one object is to provide a mounting mechanism for a pin mirror cutter which facilitates a mounting operation of the pin mirror cutter to a working machine, which can accurately perform centering without causing a decrease in rigidity, and which can efficiently transmit a rotating torque of a cutter mounting portion to a cutter body.

According to the invention, a mounting mechanism for a pin mirror cutter includes an outer peripheral surface of a cutter body having an annular shape and having cutting edges arranged on the inner periphery thereof and an inner peripheral surface of a rotating cutter mounting portion of a working machine configured to detachably receive the outer peripheral surface of the cutter body such that the cutter body and the cutter mounting portion can integrally rotate about the axis thereof. The cutter body is mounted with its outer periphery inserted into the inner periphery of the cutter mounting portion in a fitted state. The outer peripheral surface of the cutter body and the inner peripheral surface of the cutter mounting portion are in opposingly surface-contact with each other and formed into inclined surfaces whose diameters gradually decrease in the direction of insertion of the cutter body into the cutter mounting portion, and at least a part of the peripheral surfaces are formed into flat surfaces extending in a direction tangential to circles formed about the axis.

In this mounting mechanism for a pin mirror cutter, when inserting the outer periphery of the cutter body into the inner periphery of the cutter mounting portion, the outer periphery of the cutter body abuts against the inner periphery of the cutter mounting portion and the outer periphery is fitted while being guided along the inner periphery.

In this case, the inner peripheral surface and the outer peripheral surfaces are positioned while being in surface-contact with each other substantially over the entire circumferences thereof, so that the cutter body and the cutter mounting portion are aligned with the axes thereof that are coincident with each other.

Moreover, the cutter mounting portion and the cutter body are fitted to each other by the inclined surfaces whose diameters decrease in the direction of insertion of the cutter body, not by the fit of stepped portions cut out in the direction of thickness thereof as in the conventional mounting mechanism, so that the rigidity is not decreased.

Furthermore, at least a part of the inner peripheral surface of the cutter mounting portion and the outer peripheral surface of the cutter body are formed into flat surfaces extending in the direction of the tangent to circles about the axes of rotation of the cutter mounting portion and the cutter body, so that the rotation of the cutter body with respect to the cutter body is locked without depending on the key members as in conventional mounting mechanisms.

Therefore, even when the cutter body has a lesser thickness, the flat surface in the inner peripheral surface of the cutter mounting portion and the flat surface in the outer peripheral surface of the cutter body that are the driving surfaces for transmitting a rotating (cutting) torque of the cutter mounting portion side of the working machine are sufficiently large, so that the torque can be positively transmitted from the cutter mounting portion to the cutter body, and a transmitting force thereof can be increased.

In a second embodiment of the present invention, a mounting mechanism for a pin mirror cutter includes an inner peripheral surface of a cutter body formed in the shape of a ring having cutting edges arranged on the outer periphery thereof and an inner peripheral surface of a rotating cutter mounting portion of a working machine configured to detachably receive the inner peripheral surface of the cutter body such that the cutter body and the cutter mounting portion can integrally rotate about the axis thereof. The cutter body is mounted with its inner periphery fitted onto the outer periphery of the cutter mounting portion in a fitted state. The inner peripheral surface of the cutter body and the outer peripheral surface of the cutter mounting portion are in opposingly surface-contact with each other and formed into inclined surfaces whose diameters gradually decrease in the direction of insertion of the cutter body into the cutter mounting portion, and at least a part of the peripheral surfaces are formed into flat surfaces extending in the direction of the tangent to circles about the axis.

Preferably, the outer peripheral surface of the cutter mounting portion and the inner peripheral surface of the cutter body are positioned while being in surface-contact with each other over the whole circumstances thereof, so that the cutter body and the cutter mounting portion are aligned with the axes thereof that are coincident with each other. Moreover, since the cutter mounting portion and the cutter body are fitted to each other, not by the fit of the stepped portions cut out in the direction of thickness thereof, as in the conventional mounting mechanism, the rigidity is not decreased.

Furthermore, at least a part of the inner peripheral surface of the cutter mounting portion and the outer peripheral surface of the cutter body are formed into flat surfaces extending in the direction of the tangent to circles about the axes of rotation of the cutter mounting portion and the cutter body, so that the rotation is locked without depending on the key members, the driving surfaces can be sufficiently ensured even when the cutter body has a lesser thickness, so that the torque can be positively transmitted from the cutter mounting portion to the cutter body and a transmitting force thereof is increased.

Preferably, the peripheral surfaces of the cutter body and the cutter mounting portion to be in surface-contact with each other are formed by a plurality of flat surfaces over the whole circumferences thereof.

In this mounting mechanism for a pin mirror cutter, the area of the driving surfaces for transmitting the rotating torque of the cutter mounting portion to the cutter body increases, and the torque is transmitted by a plurality of driving surfaces, so that the torque is more positively transmitted from the cutter mounting portion to the cutter body, and a transmitting force there of is further increased.

DETAILED DESCRIPTION OF THE PREFERRED EMBODIMENTS

A preferred embodiment of the present invention will now be described with reference to FIGS. 1 and 2. As shown in the figures, numeral 21 denotes a pin mirror cutter, 22 denotes a cutter body having on inner periphery 22*b*, 23 denotes a cutter mounting portion, and 24 and 25 denote tapered portions.

Figure 1:
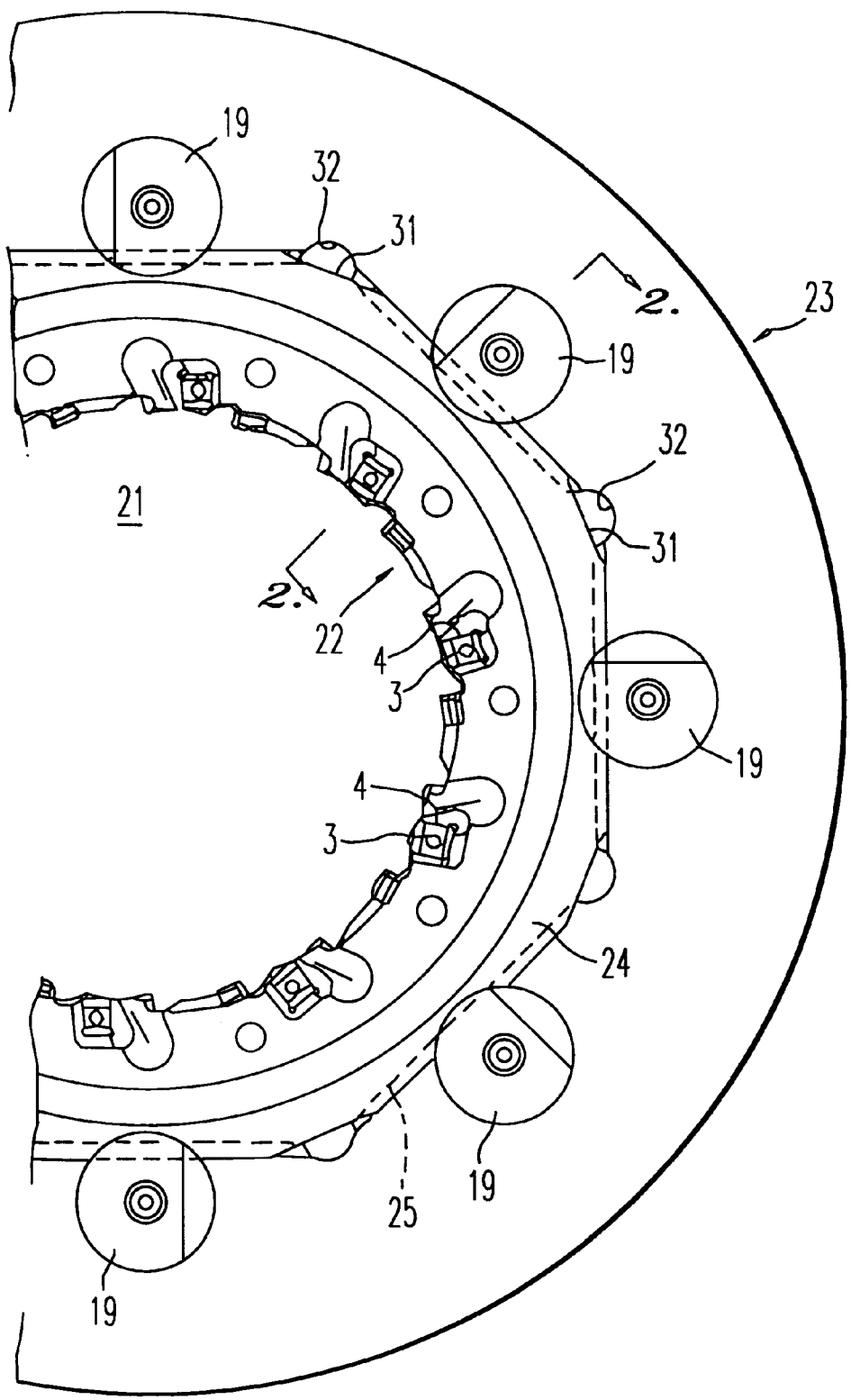
FIG. 1 is a plan view of a part of a pin mirror cutter according to an embodiment of the present invention.
Figure 2:
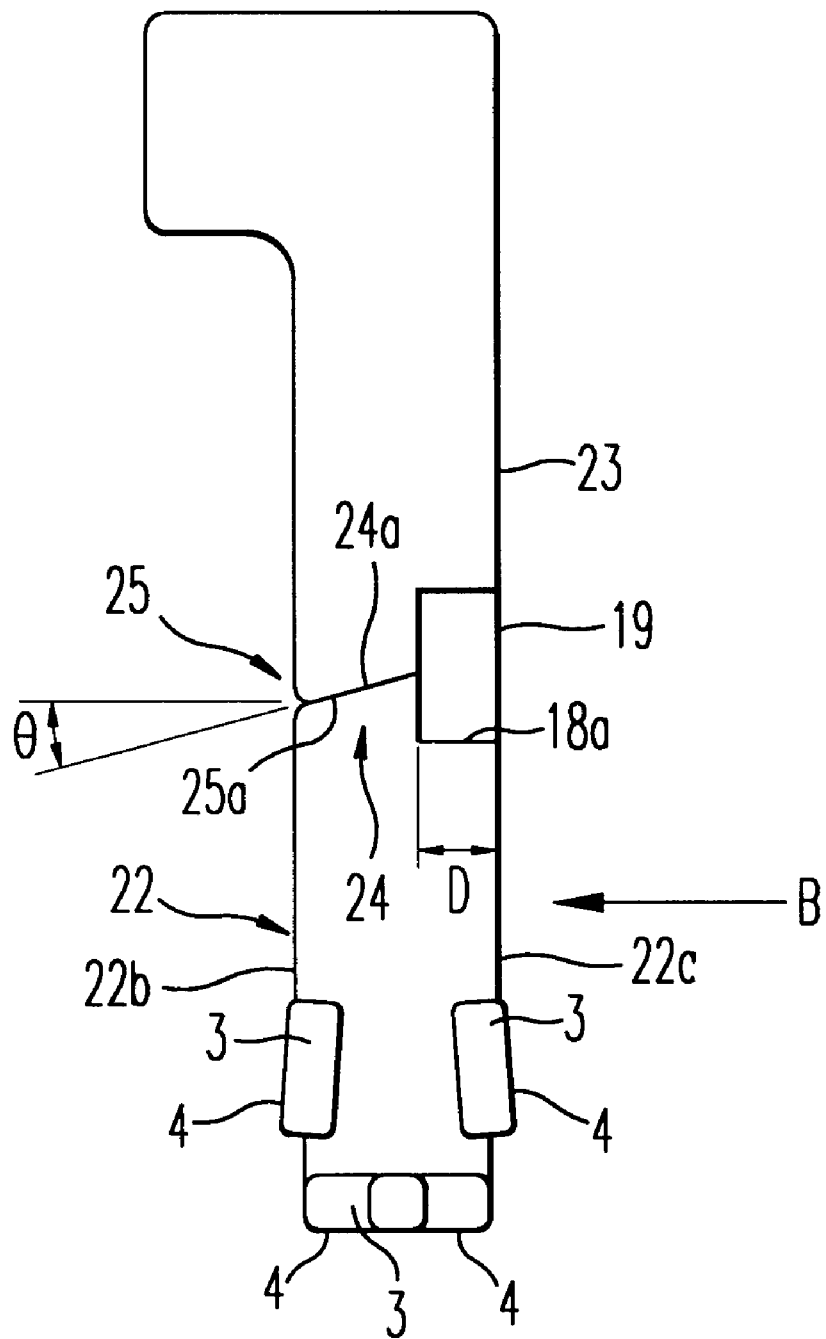
FIG. 2 is a sectional view taken along the line 2.—2. of FIG. 1.
Figure 3:
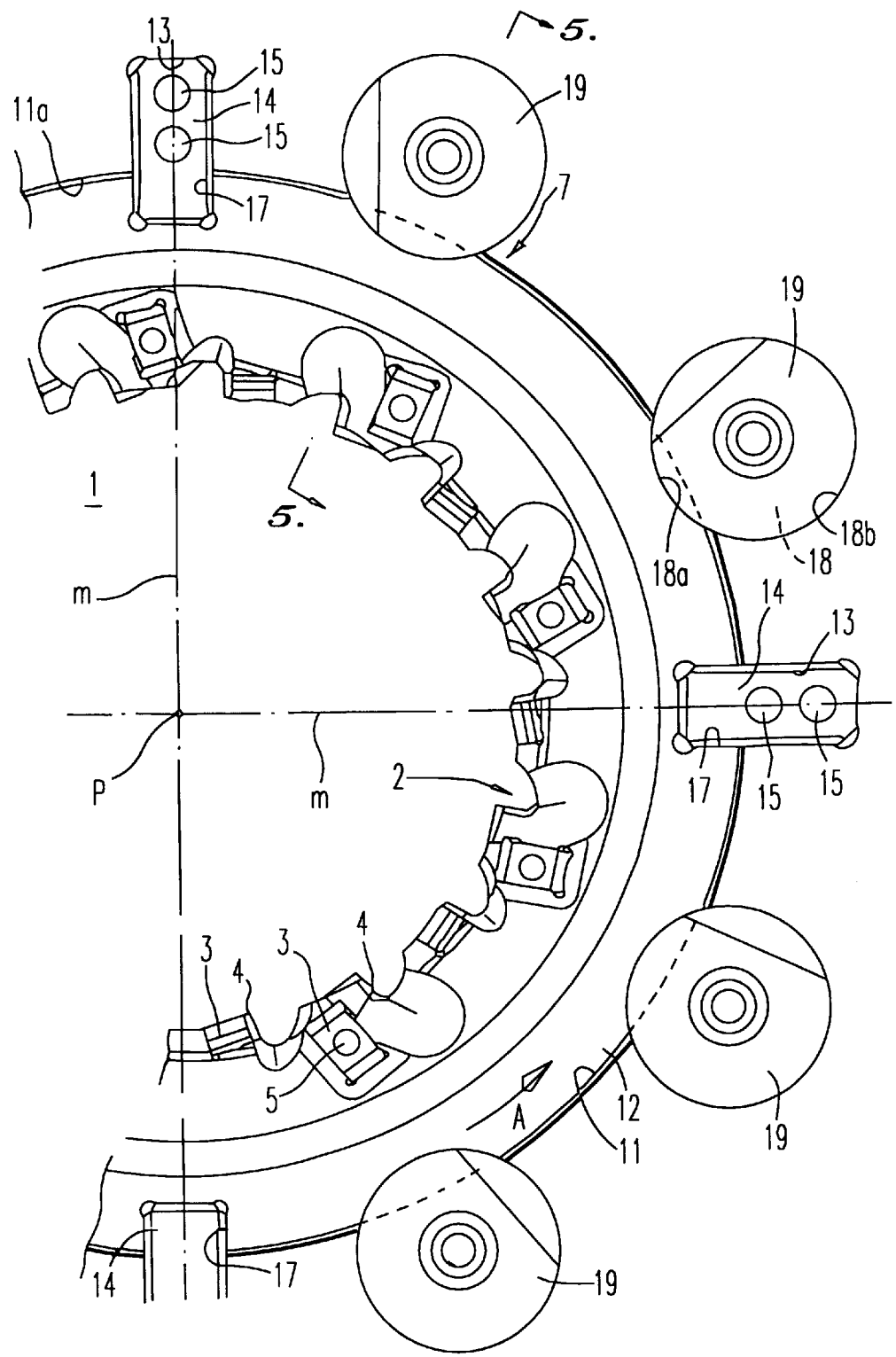
FIG. 3 is a plan view of a part of a conventional pin mirror cutter.
Figure 4:
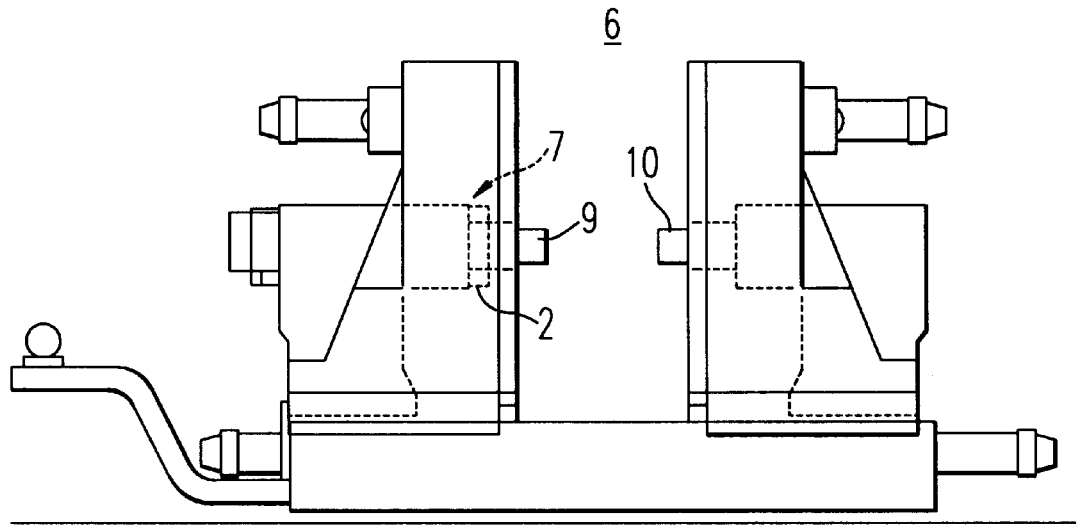
FIG. 4 schematically illustrates a construction of a working machine to which a pin mirror cutter is mounted.
Figure 5:
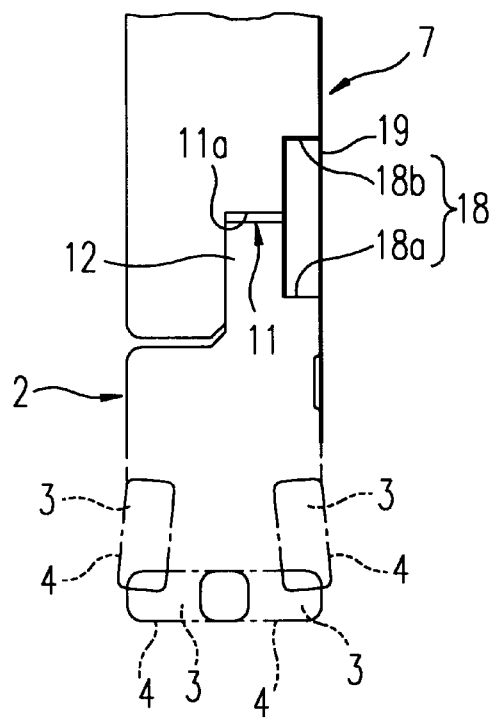
FIG. 5 is a sectional view taken along the line 5.—5. of FIG. 3.

Referring now to FIGS. 1 and 2, the cutter body 22 of the pin mirror cutter 21 and the cutter mounting portion 23 are mounted by fitting the tapered portion 24 formed on the outer periphery 22c of the cutter body 22 and the tapered portion 25 formed coaxially with a shaft of a working machine 6 on the inner periphery of the cutter mounting portion 23, to each other.

The outer peripheral surface of the tapered portion 24 in the cutter body 22 and the inner peripheral surface of the tapered portion 25 in the cutter mounting portion 23 are opposingly in surface-contact with each other, as shown in FIG. 2, and are formed into inclined surfaces 24a and 25a such that the diameters thereof gradually decrease in the direction of insertion (the arrow B in the drawing) of the cutter body 22 into the cutter mounting portion 23.

In addition, the inclined surface 24a of the tapered portion 24 and the inclined surface 25a of the tapered portion 25 has an angle of inclination θ of the cutter mounting portion 23 with respect to the axial direction, respectively, that is preferably set within the range of 1° to 50°. In this embodiment, the inclined surfaces have an angle of inclination θ set to 15°.

The angle of inclination θ is set to the above range because a supporting force for locking the cutter body 22 in the axial direction thereof during working is insufficient when the angle is less than 1°. However, when θ exceeds 50°, the thickness of the tapered portion 25 in the direction of the arrow B is quite small, thereby compromising the rigidity thereof, such that the cutter body 22 is likely to move in its radial direction. Additionally, when the θ exceeds 50°, the outside diameter of the cutter body 22 becomes much larger than the thickness thereof.

Furthermore, in this embodiment, the inclined surfaces 24a and 25a of the tapered portions 24 and 25 of the cutter body 22 and the cutter mounting portion 23 are formed into regular octagonal pyramid surfaces, and corners of the regular octagonal pyramid are chamfered to form chamfers 31 regarding the cutter body 22, and are cut out so as to form stealing holes 32 regarding the cutter mounting portion 23.

That is, the inclined surface 24a of the cutter body 22 and the inclined surface 25a of the cutter mounting portion 23 that are in surface-contact with each other are formed by a plurality of flat surfaces extending in the direction of the tangent to circles about the axis of the cutter body 22 substantially over the entire circumferences thereof.

In a mounting mechanism for this pin mirror cutter 21, the inclined surface 24a of the tapered portion 24 formed on the cutter body 22 and the inclined surface 25a of the tapered portion 25 formed on the cutter mounting portion 23 are opposingly in surface-contact with each other, where the diameters thereof gradually decrease in the direction of insertion of the cutter body 22 into the cutter mounting portion 23, so that, when inserting the cutter body 22 into the cutter mounting portion 23, they are fitted to each other while the inclined surface 24a are guided along the inclined surface 25a.

In this case, the inclined surface 24a of the cutter body 22 and the inclined surface 25a of the cutter mounting portion 23 are formed into regular octagonal pyramidal surfaces having the axes coincident with the axes of the cutter body 22 and the cutter mounting portion 23, respectively, so that they are in surface-contact with each other substantially over the entire circumferences thereof, except the portions corresponding to the above chamfers 31 and stealing holes 32, thereby aligning the axes of the cutter body 22 and the cutter mounting portion 23 with each other.

Moreover, since the cutter mounting portion 23 and the cutter body 22 are fitted to each other, not by a fit of stepped portions cut out in the direction of thickness thereof as in the above-described conventional art, but by the inclined surfaces 24a and 25a whose diameters gradually decrease in the direction of the insertion of the cutter body 22, the rigidity of the tapered portions 24 and 25 is not compromised.

In addition, the cutter mounting portion 23 and the cutter body 22 are fitted to each other by the fit of the tapered portions 24 and 25, whereby the depth D of the circular recess 18 can be ensured. Therefore, a sufficient thickness of the clamps 19 to be fitted to the circular recess 18 can be ensured, and the rigidity of the clamps 19 is not decreased.

For this reason, even when the cutter body 22 having a small thickness is used in accordance with the size of the workpiece or even when the cutting load increases, such as during high-speed and rapid-feed cutting, chatter generated during cutting is suppressed, and breakage of the chips 3 and a decrease in working accuracy caused by the chatter can be prevented.

Furthermore, in the mounting mechanism of this embodiment, the inclined surface 25a of the cutter mounting portion 23 and the inclined surface 24a of the cutter body 22 that are the driving surfaces for use in torque transmission from the cutter mounting portion 23 to the cutter body 22 are formed by a plurality of flat surfaces extending in the direction of the tangent to the circles about the axes of rotation thereof, so that the rotation of the cutter body 22 with respect to the cutter mounting portion 23 is locked without depending on a key fitting as in the conventional art.

For this reason, even when the cutter body 22 has a small thickness, the area of the driving surfaces for transmitting the rotating torque of the cutter mounting portion 23 to the cutter body 22 increases, and the torque is transmitted by a plurality of driving surfaces, so that the torque transmission is effected over a large surface area and a transmitting force can be further increased.

Furthermore, conventional key members can be eliminated to reduce the number of components, and attaching and detaching operations of the cutter body 22 to and from the cutter mounting portion 23 can therefore be simplified.

While the inner and outer peripheral surfaces of the cutter body 22 and the cutter mounting portion 23 are connected by flat surfaces so that the inclined surfaces 24a and 25a thereof are formed into regular octagonal pyramid surfaces in this embodiment, the inclined surfaces may be formed into other polygonal pyramid surfaces, or the flat surfaces may be formed into a shape to cut out a part of cone surfaces.

In addition, while a so-called internal-type pin mirror cutter in which chips are mounted on the inner periphery of the cutter body 22 has been described in this embodiment, the pin mirror cutter is not limited thereto, and the pin mirror cutter may be a so-called external-type pin mirror cutter in which chips are mounted with cutting edges projected on the outer periphery of the cutter body 22.

In this case, the same construction as the above-described embodiment may be employed except that tapered portions are formed on the inner periphery of a cutter body and on the outer periphery of a cutter mounting portion, and the tapered portions are inserted and mounted in a fitted state. With the described construction, a mounting operation of the pin mirror cutter to the working machine is facilitated, centering can be accurately performed without causing a decrease in rigidity, and the rotating torque of the cutter mounting portion can be efficiently transmitted to the cutter body.

As will be understood from the foregoing description, the present invention can provide several advantages. For example, in the mounting mechanism for a pin mirror cutter according to the first embodiment of the invention, the outer peripheral surface of the cutter body and the inner peripheral surface of the cutter mounting portion are formed into inclined surfaces whose diameters gradually decrease in the direction of insertion of the cutter body, so that positioning is spontaneously effected when the outer periphery of the cutter body is inserted into the inner periphery of the cutter mounting portion and centering of the cutter body and the cutter mounting portion can be precisely and positively performed. Therefore, the centering operation when mounting the cutter body is facilitated, and the workpiece can be worked into an accurate, truly round shape.

In addition, the cutter mounting portion and the cutter body are fitted to each other by the inclined surfaces whose diameters decrease in the direction of insertion of the cutter body, not by the fit of the stepped portions cut out in the direction of the thickness thereof as in the conventional mounting mechanism, so that a decrease in rigidity of the fitted portions can be prevented and further, the thickness of the clamps for clamping the outer periphery of the cutter body and the inner periphery of the cutter mounting portion can be sufficiently ensured, and a decrease in rigidity thereof can be prevented.

Therefore, even when the cutter body having a small thickness is used in accordance with the size of the workpiece or even when the cutting load increases, such as during high-speed and rapid-feed cutting, chatter generated during cutting is suppressed, and breakage of the chips and a decrease in working accuracy caused by the chatter can be prevented.

Furthermore, at least a part of the inner peripheral surface of the cutter mounting portion and the outer peripheral portion of the cutter body are formed into flat surfaces extending in a direction tangential to circles about the axes of rotation thereof, so that key members can be eliminated, and even if the cutter body has a small thickness, torque can be positively transmitted from the cutter mounting portion to the cutter body and a transmitting force thereof can be increased.

In addition, with the key members are eliminated, the number of components is reduced, and attaching and detaching operations of the cutter body to and from the cutter mounting portion are simplified. The same advantages can be achieved in an external-type pin mirror surface.

When the peripheral surfaces of the cutter body is provided with a plurality of flat surfaces, the area of the driving surfaces for transmitting the rotating torque of the cutter mounting portion to the cutter body increases, and the torque is transmitted by a plurality of driving surfaces in either an internal-type or external-type pin mirror cutter.

This application claims priority and contains subject matter related to Japanese patent application No. HEI 10-010825 filed in the Japanese Patent Office on Jan. 22, 1998, the entire contents of which are hereby incorporated by reference.

What is claimed as new and desired to be secured by Letters Patent of the United States is:

1. A mounting mechanism for a rotating tool, comprising:
   an outer peripheral surface of a cutter body which is annular in shape and includes cutting edges on an inner periphery, said outer peripheral surface being tapered with an angle of inclination with respect to a rotational axis of the cutter body, said outer peripheral surface including at least one flat portion arranged tangentially to a circle centered on said rotational axis;
   an inner peripheral surface of a cutter mounting portion, said inner peripheral surface being tapered to detachably receive said outer peripheral surface, said inner peripheral surface including at least one substantially flat portion arranged tangentially to a circle entered on said rotational axis so as to contact said at least one substantially flat portion included on said outer peripheral surface when said outer peripheral surface is received by said inner peripheral surface, wherein said outer and inner peripheral surfaces are configured to be in surface-to-surface contact with each other, each of said inner and outer peripheral surfaces are formed by a plurality of substantially flat surfaces so as to form a substantially pyramidal surface on each of said inner and outer peripheral surfaces, comers of the pyramidal surfaces are cut to form stealing holes, and wherein said corners of said outer peripheral surface are chamfered.

2. The mechanism according to claim 1, wherein said outer peripheral surface has a diameter that gradually decreases in a direction of insertion into said inner peripheral surface.

3. The mechanism according to claim 1, wherein said outer and inner peripheral surfaces are configured to be in surface-contact with each other and wherein each of said inner and outer peripheral surfaces are formed by a plurality of flat surfaces substantially over an entire circumference thereof.

4. The mechanism according to claim 1, wherein said inner peripheral surface is tapered at an second angle of inclination substantially equal to said angle of inclination of said outer peripheral surface.

5. The mechanism according to claim 1, wherein said angle of inclination is from 1° to 50°.

6. The mechanism according to claim 1, wherein said angle of inclination is 15°.

7. The mechanism according to claim 1, wherein said plurality of flat surfaces form regular octagonal pyramidal surfaces on each of said inner and outer peripheral surfaces.

8. A mounting mechanism for a rotating tool, comprising:
   an inner peripheral surface of a cutter body which is annular in shape and includes cutting edges on an outer periphery, said inner peripheral surface being tapered with an angle of inclination with respect to a rotational axis of the cutter body, said inner peripheral surface including at least one flat portion arranged tangential to a circle centered on said rotational axis;
   an outer peripheral surface of a cutter mounting portion, said outer peripheral surface being tapered to detachably receive said inner peripheral surface, said outer peripheral surface including at least one substantially flat portion arranged tangentially to a circle centered on said rotational axis so as to contact said at least one substantially flat portion included on said inner peripheral surface when said outer peripheral surface is received by said inner peripheral surface, wherein said outer and inner peripheral surfaces are configured to be in surface-to-surface contact with each other, each of said inner and outer peripheral surfaces are formed by a plurality of substantially flat surfaces so as to form a substantially pyramidal surface on each of said inner and outer peripheral surfaces, corners of the pyramidal surfaces are cut to form stealing holes, and wherein said corners of said outer peripheral surface are chamfered.

9. The mechanism according to claim 8, wherein said outer peripheral surface has a diameter that gradually decreases in a direction of insertion into said inner peripheral surface.

10. The mechanism according to claim 8, wherein said outer and inner peripheral surfaces are configured to be in surface-contact with each other and wherein each of said inner and outer peripheral surfaces are formed by a plurality of flat surfaces substantially over an entire circumference thereof.

11. The mechanism according to claim 8, wherein said inner peripheral surface is tapered at a second angle of inclination substantially equal to said angle of inclination of said outer peripheral surface.

12. The mechanism according to claim 8, wherein said angle of inclination is from 1° to 50°.

13. The mechanism according to claim 8, wherein said angle of inclination is 15°.

14. The mechanism according to claim 8, wherein said plurality of flat surfaces form regular octagonal pyramidal surfaces on each of said inner and outer peripheral surfaces.

* * * * *